Aug. 19, 1969   A. MONZALI   3,462,210
BOOK WITH PAGES VIEWABLE IN THREE DIMENSIONS
AND WITH VIEWER INCORPORATED
Filed Dec. 20, 1965   2 Sheets-Sheet 1
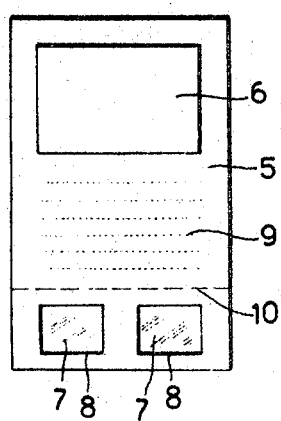
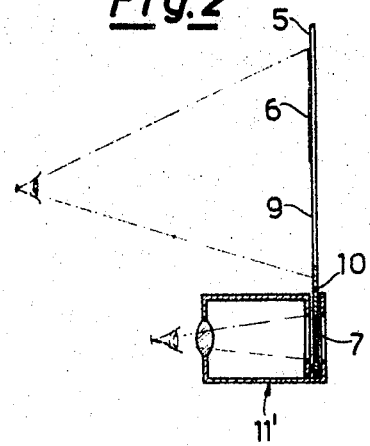
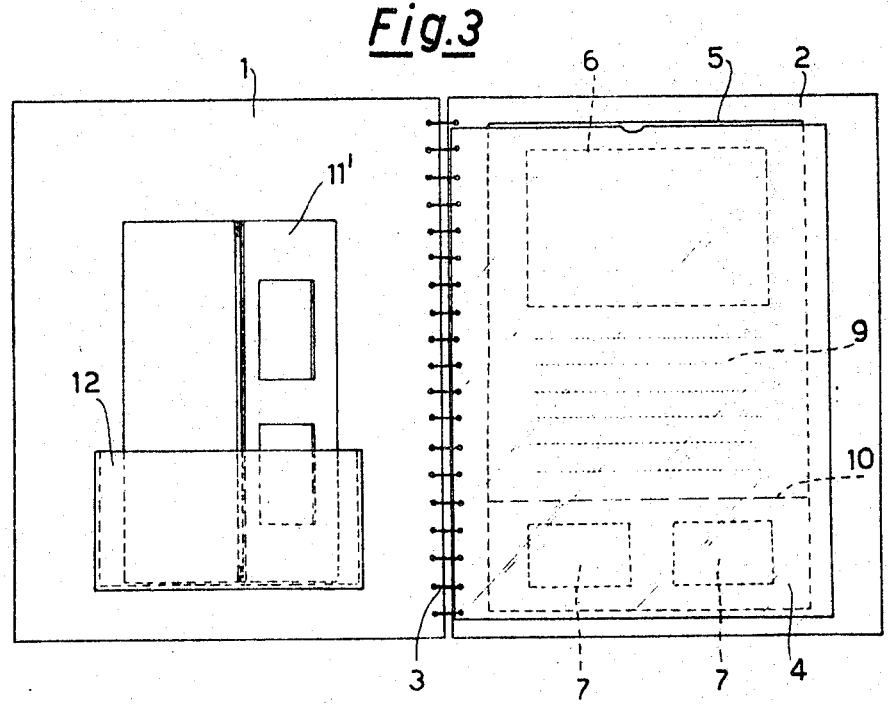
INVENTOR
Aristide Monzali
BY
Mason, Porter, Diller & Brown
ATTORNEYS

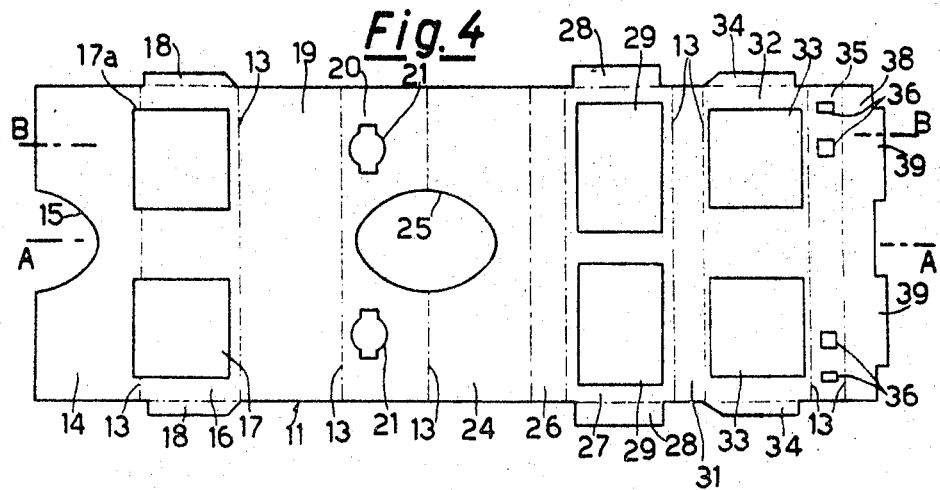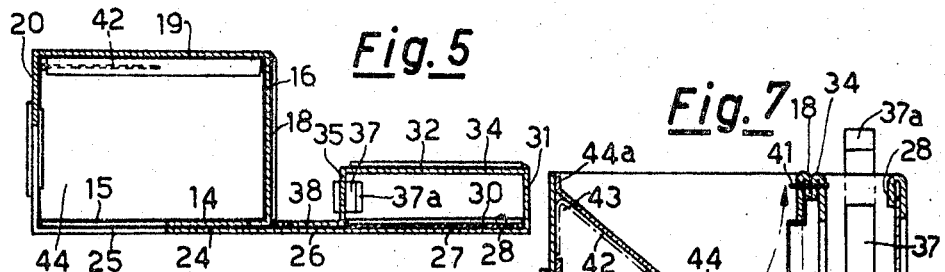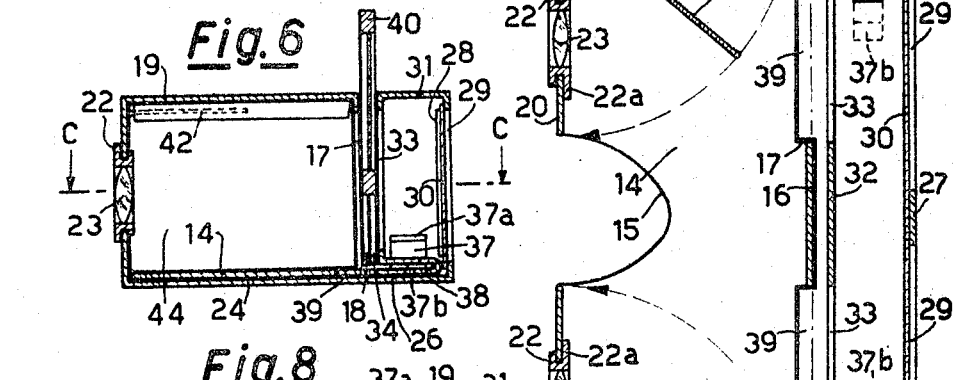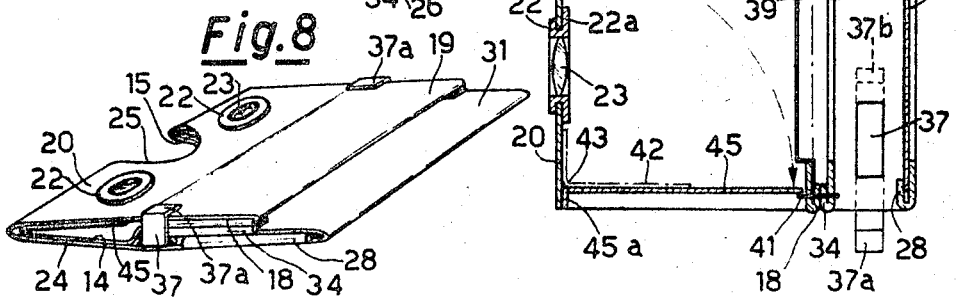

United States Patent Office 3,462,210
Patented Aug. 19, 1969

3,462,210
BOOK WITH PAGES VIEWABLE IN THREE DIMENSIONS AND WITH VIEWER INCORPORATED
Aristide Monzali, Rome, Italy, assignor to Rizzoli Editore S.p.A., Milan, Italy, a company of Italy
Filed Dec. 20, 1965, Ser. No. 515,121
Claims priority, application Italy, Dec. 23, 1964, 27,302/64
Int. Cl. G02b 27/22
U.S. Cl. 350—140                                        3 Claims

ABSTRACT OF THE DISCLOSURE

A book containing written and pictorial information, especially for divulging a series of steps in an operative process. The book contains removable leaves carried in transparent pockets joined to the cover leaves of the book. Each leaf has on its upper part images, designs and illustrative legend of a subject, and, on its lower part, two windows containing photograms of said subject for providing a stereoscopic view. A flat foldable stereoscopic viewer apparatus is carried in a pocket on the internal face of one of the cover leaves for viewing the photograms on the leaves.

---

The present invention regards a book of which the function is to contain a plurality of pages, or cards, inserted in extractable fashion, each bearing at least one illustration or one legend; such pages house at their base, within spaces designed for the purpose, a pair of photograms of a kind suitable to allow the three-dimensional viewing of their subject when the page is inserted into a viewer, preferably of the foldable type capable of being folded flat and therefore of being inserted and kept within the book itself.

The invention has as its purpose the realization of a practical means of information and didactic, technical, scientific and similar divulgation, through the instrumentality of the combination and conjunction, in one single unit, of two highly effective technical means – the traditional means of editorial printing and that of three-dimensional viewing, the latter being endowed with extraordinary demonstrative and documentary force.

It is clear that the fields of application of invention are all those that are accessible to any publishing activity of standard kind. For example, there is a notably interesting application in the case where it is wished, by exploiting the method according to the invention, to describe a given surgical operation. In such case, the pages of the book will each concern a determined stage of the operation and will be progressively numbered and inserted in the book according to such numeration. Thus, by turning the pages of the book in order, and by studying the illustration and the legend appearing on each page, it will be possible to follow the various successive stages of the operation and to effect the total study of the technique adopted and of whatever else the author has seen fit to express, as normally occurs in the case of consultation and study of a standard treatise on surgical technique.

Then, merely by extracting the page and inserting it into the viewer, there can automatically be obtained the three-dimensional view, perfectly true to reality, of the picture of which each page bears illustration and description. Furthermore, the observer's eye can shift its attention to examine, on the upper part of the page, the plan-view illustration of the same subject or, still better, a conceptualized graphic design thereof to which there can be added, for explanatory reasons, parts, details or references not visible in reality, as can be done for example by drawing an outline of the position and form of an organ that lies beneath another organ.

The legend relative to the said illustration will, then, have didactic, technical, scientific, etc., value, or will serve also to direct and concentrate the attention of the observer onto more important particulars, or to guide such concentration to seek out and recognize such particulars in the true-to-reality view of the area of the operation, such view being offered by the three-dimensional rendering. The illustration seen two-dimensionally and that seen three-dimensional can, furthermore, one represent the totality of the subject and the other the particular, or vice-versa.

In such manner, with means that are both rapid and exhaustive, a surgeon or anyone interested in the matter becomes able not only to make a complete study of, but also to investigate deeply in a truly radical way, traditional or new surgical techniques. A means of this kind, furthermore, when considered from the point of view of its completeness, extreme simplicity and practicality of use, as well as of the insuperable efficiency of the three-dimensional rendering, presents advantages that are without doubt superior even to those of cinematographic projection and to those of projection of slides, since the former makes it impossible for the spectator to dwell, at will, on details and particulars of interest to him (especially in the case of collective projections) and the latter is unable to offer, by reason of its giving only flat images, anything but an inexact view of the reality — to make no mention of the inconveniences and disturbances that both the said methods involve as a result of the necessity to prepare the apparatuses indispensable for the projection, screens and suitable environments.

There exist no limitations or contraindications to the use of the present invention, which can find applications in the most diverse sectors, as examplification, there has been set out above the case of illustration of a surgical operation, but what has been stated in that connection can apply also for illustration of the regression of an illness up to its cure; furthermore, and again in the medical field, it can be used for the documentation of diverse clinical cases, or for profound study of anatomy, or, in other fields, for demonstration of an industrial processing method, starting from the raw material and concluding with the finished product, and for demonstration of experiments, or presentation of products resulting from technics, industry, art and the like.

The drawing annexed to the present specification shows, as non-limiting exemplification, one form of embodiment of the invention.

FIG. 1 shows an isolated page or card.

FIG. 2 shows, in vertical section, a single page or card inserted into a viewer.

FIG. 3 is the view of the open book, where there can be seen the viewer that has been folded flat and inserted into a pocket, which will be on one of the inside covers of the book.

FIG. 4 represents, a punched-out sheet of cardboard in plan view and seen from the inside face, with which sheet the viewer-apparatus is constructed.

FIG. 5 shows, in longitudinal section according to the central line A—A of FIG. 4, the said sheet of cardboard after the first folding operation for the assembly of the viewer-apparatus.

FIG. 6 shows in longitudinal section according to the line B—B of FIG. 4, the sheet of cardboard after completion of the assembly stage of the viewer-apparatus and while there is about to be inserted into an appropriate frame a small frame bearing a pair of stereoscopic devices.

FIG. 7 is a horizontal section of the assembled viewer-apparatus along the line C—C of FIG. 6.

FIG. 8 is a perspective view of the apparatus, folded and held firm in a form of minimum bulk.

As is shown in FIGS. 1 and 3 the book in question comprises a cover, consisting of a front leaf 1 and of a back leaf 2, between which are inserted the pages which are interconnected by a connecting device 3, which in the example illustrated consists of a metal spiral, while the pages are formed by transparent pockets 4 in which cards 5 are insertable in an extractable manner. The said pages could however be formed of the cards themselves which, in such case, can contain standard perforations: in such case, the device 3 can be substituted with any known device of the openable type, whereby to extract the cards forming the pages.

The cards 5 consist each of an adequately rigid sheet, such as paperboard or the like, on one of the faces of which is reproduced, in the upper part 6, for example, a graphic reproduction of the subject, if so desired accompanied by symbols, references or by parts that are not normally visible. Some photograms are indicated with the numeral 7 and are housed in windows 8 formed in the body of the card 5 and serving for the three-dimensional viewing of the subject.

Additionally, the image 6 will bear all the indications requisite for making clear the more important particular of the subject, while the legend beneath, indicated with the numeral 9, will explain the said particulars and will supply other data on the subject.

The zone incorporating the photograms 7 is separated from the remaining part of the card by a tear-line 10, which will allow, if desired, the separation of a frame comprising the photograms 7 from the remaining part of the card, and this in the case were it is wished, for special reasons, to reduce the photograms down into the conventional frame form, for filing in standard steroscopic photogram files, or for the purpose of being able to view them by means of sandard type viewers.

The card 5, in its form as shown in FIGS. 1 and 3, is utilizable for the obtaining of a stereoscopic view of the subject, by means of a special improved viewer which will be described in more detail hereafter and which is characterized by being made out of cardboard, by being foldable flat and by being inexpensive.

The said viewer-apparatus is indicated generically with the numeral 11' in the FIGS. 2 and 3 of the annexed drawing.

Owing to its particular characteristics, it can accompany the book in question, being housed, in flat folded form, in a pocket 12 located on the inside of the cover leaf 1.

Therefore, when it is wished to use the book for the particular purpose for which it is designed, the viewer 11' is extracted and into it are inserted successively and in order the cards 5, these being extracted from the transparent pockets 4, or else extracting the pages in the form of cards and inserting them in the viewer 11', the part inserted being the edge near which the photograms 7 are fixed. By reading the legend 9 of each card 5 and by examining alternately the image 6 and the three-dimensional image supplied, by means of the viewer 11', of the photograms 7 of each of the pages 5, the observer will be enabled to gain knowledge of the technique, for example, of a new surgical operation or other process, thoroughly examining each of its more important stages.

The viewer apparatus is such that it performs all the functions of the already known and more costly fixed apparatuses, and has both the advantage of limited cost and the advantage of being capable of reduction minimum bulk. It furthermore allows the viewing of series of diapositives, photographs, prints or the like which are successively introduced into and extracted from a housing provided in the apparatus and so shaped as to allow every diapositive or the like to settle automatically into the position foreseen for its perfect observation. The viewer apparatus will be described in more detail hereafter, with reference to the FIGS. 4 to 8 of the annexed drawings.

In the FIG. 4, the numeral 11 generically indicates a sheet of cardboard, slightly flexible or the like or preferably treated with plastic material, to increase its life. The sheet 11, and two rectangular members 44 and 45 of similar material which constitute lateral doors of the viewer, substantially compose the entire apparatus. The sheet 11 is formed with a shape that is symmetrical in respect of the longitudinal dividing line A—A and it comprises a succession of panels, separated by fold-lines 13 which are obtained, for example, by beading or other suitable system. From left to right in FIG. 4, the numeral 14 indicates the first panel, which has along the transversal edge and astride the line A—A, a cavity in the form of a semi-ellipse.

In the second panel 16 there are provided two rectangular windows 17 symmetrical to the dividing line A—A. The outside edges of the panel 16 have protruding borders 18. The third panel 19 consists of a continuous wall. The fourth panel 20 is intended to constitute the rear wall of the viewer, through which the images will be observed by means of lenses 23 which are set in the said rear wall. In the panel 20 there are thus located two housings 21 for supports 22, bearing the lenses 23. Each support 22 consists of a frame in slightly flexible and elastic material, within which the lens 23 is inserted by pressure: the support 22 has a short overhanging outer boarder, with which it is kept firm against the outer face of the panel 20, and also two tongues 22a which, after having been elastically bent, are caused to penetrate through the housings 21. When the said tongues are left free they remain firm, elastically reassuming their shape, against the inner face of the panel 20. In the central zone of the panel 20 and of the successive panel 24 there is an elliptical opening 25 which is symmetrical in respect of the line A—A and also the line 13, which separates the panels 20 and 24. The semi-elliptical opening 15 of the panel 14 is half of the elliptical opening 25. The sixth panel 26 has no particularities, while the seventh panel 27 has protruding borders 28 and also two windows 29 that are symmertical in respect of the line A—A; over such windows there is placed a sheet 30 of translucent paper or other material suitable for light diffusion, such as a frosted tape, or the like. The eighth panel 31 has not any specific particularities. The ninth panel 32 is almost identical to the panel 16 and thus has the windows 33 and the protruding borders 34. The tenth panel 35 has two pairs of transversal slits 36, within which locking means will become inserted, including the strips 37 fitted with bent ends 37a and, at the opposite extremity, has a stop-member 37b. The final panel 38, at its transversal edge, has a pair of tongues 39. It is noted that the following lengths are substantially equal: the lengths of panels 14, 19 and 24: of the panels 16, 20, 27, 32 and of the panels 26, 31, 35 and 38.

It is further noted that perpendicular to the line A—A the dimensions of the openings 17, and 33 are almost equal, while those of the openings 29 are slightly larger and, that in direction parallel with the line A—A, the windows 17 are slightly longer than the openings 29 and 33, since they exceed, for a short section, the line 13 of separation between the panels 14 and 16. For the assembly of the apparatus (FIG. 5), the panels 14, 16, 19 and 20 are folded along the lines 13, so as to realize a first box-like rectangular section element in which the panel 14 is fixed onto the panel 24.

In such form, the semi-elliptical opening 15 is superimposed exactly on the semi-elliptical part of the opening 25, in panel 24, in such a way that the first box-like compartment thus formed comes to have, on the line A—A, an opening which serves for placing the viewer astride the nose of the observer. The remaining panels 27, 31, 32, 35 are then folded to form therewith a second box-like rectangular-section member, of which the base formed by the panel 27 is in the said stage of assembly coplanar with the panels 24 and 26; the panel 38 is fixed onto the panel 26, it being easy to place it without incertitude into the correct position since the tongues 39 have to become inserted into the cavities 17a that are created in the panel 14 by the prolongation of the windows 17 beyond the fold-line 13 between the panels 14 and 16. The strips 37 are then inserted into the slits 36. The relatively elastic material of which sheet 11 is constituted, when slightly deformed, permits the passage of the stop-members 37b into the slits 36. When pressure is ceased, the material of the sheet 11 takes on its normal shape again and the stop-members 37b prevent the strips 37 from slipping out of their seatings beyond a predetermined limit. There is then applied on the inside face of the panel 27 the translucent sheet 30, its edges being glued to the said inside face and the borders 28 of the panel 27 being folded back and glued onto its transversal edges.

The borders 18 are then bent back against the outside face of the panel 16, while the borders 34 are folded back against the outside face of the panel 32; the second box-like element, consisting of the panels 27, 31, 32 and 35 is then caused to rotate through 90° until the panel 35 is made to rest against the panel 38.

In such position, the borders 18 and 34, by inter-supporting themselves, keep the panels 16 and 32 at a distance one from the other and form a housing slot for a frame 40 of which slot they constitute the vertical guides. In each flank of the viewer there is applied at least one metal staple 41, which rigidly connects the panel 16 to the panel 32, in the zone where there are located the borders 18, 34 facing each other. The said metal staples which protrude slightly from the inside of the panel 16, constitute a stop for the moving flaps 44 and 45, which close the first box-like member, in the rear wall of which are inserted the lenses 23. The flaps 44 and 45 are fixed by means of vertical borders 44a and 45a respectively to the wall 20, hinging on axes 43. A spring 42 interposed between each of the flaps 44 and 45 and the panel 20 tends to push each flap 12 towards the outside until each flap comes to a halt against the respective metal insert 41. The flaps 44 and 45 in such position (illustrated in the lower part of FIG. 7) act as stiffening element for the box-like construction into which they are inserted, thus preventing it from deformation. Therefore, when the viewer-apparatus is in the position according to FIG. 6, it behaves in the manner of an undeformable system and thus allows viewing of the images in the conditions pre-established for such viewing. The said disposition of the parts cannot be altered, either during the replacement of one diapositive with another and not even in the case of careless handling of the viewer-apparatus by the observer.

When the apparatus is not in service, it can be reduced to minimum bulk. To achieve this it is necessary to push, in the direction indicated by the arrow in FIG. 7 and against the action of the spring 42, with both hands, the flaps 44 and 45 towards the inside until they fold back by rotation about the axes 43 against the panel 20. When the flaps 44 and 45 are at rest against the panel 20, the complex can be folded flat, as is shown in FIG. 8, by closing-up the plane of the upper panels 19 and 31 to that of the panels 24 and 26 to the limit allowed by the thicknesses of the interposing parts. Such operation can be effected even if a frame 40 is in its housing. When the complex has been folded as flat as possible, the locking strips 37, which, with the bent heads 37a come to exert a grip over the flat folded complex and keep it in that position, are pushed inwards to achieve the aforesaid effect. To bring the complex back into service position, it suffices merely to distance the locking strips 37, causing them to move in contrary direction. Thereafter, the viewer-apparatus automatically returns to the service position as shown in FIG. 6, since the springs 42 push the flaps 44 and 45 outwards and they, coming up against the panels 20, 14, 19 and 16 oblige these, and indirectly also the panels 27, 31 and 32, to resume the position as shown in FIG. 6, where the viewer-apparatus is ready for immediate use.

It is noted that with the viewer-apparatus in question it is also possible to observe stereoscopic photographs printed on paper, prints or the like.

The viewer-apparatus represented is foreseen for the viewing of stereoscopic diapositives, but there is nothing to prevent it from being embodied with whatever adaptations are necessary for the viewing of one single diapositive.

The embodiments of the invention in which an exclusive property or privilege is claimed are defined as follows:

1. A book with removable and reinsertable leaves, each leaf carrying on its upper part images, designs and illustrative legend of a subject, and, on its lower part, two windows containing photograms of said subject for providing a stereoscopic view; a flat foldable stereoscopic viewer apparatus carried in and removable from a pocket on the internal face of one of the cover leaves, said viewer apparatus having means for receiving the lower part of a leaf removed from said book for stereoscopic viewing of said photograms therewith, the leaves being carried in pockets joined to the cover leaves of the book, the leaves being numbered in succession, each leaf representing a complete step in a sequential step-by-step operative process, and wherein the upper part of each leaf is adapted to extend out of said viewer apparatus for viewing with the naked eye while said lower part is received in said means for stereoscopic viewing of said photograms.

2. The book of claim 1 wherein said pockets are formed of transparent material.

3. The book of claim 1 wherein said receiving means is a slotted guide housing.

References Cited

UNITED STATES PATENTS

| | | | |
|---|---|---|---|
| 1,012,144 | 12/1911 | Murphy | 350—140 |
| 1,405,134 | 1/1922 | Hoyme | 35—35.5 |
| 2,145,423 | 1/1939 | Long | 350—140 |
| 2,322,393 | 6/1943 | Richardson et al. | 350—132 |
| 2,334,483 | 11/1943 | Dennis | 350—140 |
| 2,683,391 | 7/1954 | Nichols | 350—140 |
| 2,768,554 | 10/1956 | Leslie | 350—140 |
| 2,789,460 | 4/1957 | Kaufman | 350—140 |
| 2,795,067 | 6/1957 | Walker | 40—106.1 |
| 2,933,015 | 4/1960 | Somach | 350—140 |
| 2,934,999 | 5/1960 | Baumel | 350—140 |
| 3,289,319 | 12/1966 | Kiehl | 35—8 |

FOREIGN PATENTS

| | | |
|---|---|---|
| 657,095 | 10/1963 | Italy. |
| 578,082 | 9/1931 | Germany. |

DAVID SCHONBERG, Primary Examiner

P. R. GILLIAM, Assistant Examiner

U.S. Cl. X.R.

40—106.1